(12) United States Patent
Tsukada

(10) Patent No.: US 12,649,573 B2
(45) Date of Patent: Jun. 9, 2026

(54) CONTROL DEVICE

(71) Applicant: TOYOTA JIDOSHA KABUSHIKI KAISHA, Toyota (JP)

(72) Inventor: Taro Tsukada, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 18/987,672

(22) Filed: Dec. 19, 2024

(65) Prior Publication Data

US 2025/0223034 A1     Jul. 10, 2025

(30) Foreign Application Priority Data

Jan. 9, 2024     (JP) ................................. 2024-001330

(51) Int. Cl.
*B64C 31/06* (2020.01)
(52) U.S. Cl.
CPC .................................... *B64C 31/06* (2013.01)
(58) Field of Classification Search
CPC ..................................................... B64C 31/06
See application file for complete search history.

(56) References Cited

U.S. PATENT DOCUMENTS

| | | | |
|---|---|---|---|
| 2023/0003188 A1* | 1/2023 | Vermillion | ................ F03D 7/00 |
| 2024/0278911 A1* | 8/2024 | Song | ....................... F03D 9/322 |

FOREIGN PATENT DOCUMENTS

| | | | |
|---|---|---|---|
| JP | 2020-147266 A | 9/2020 | |
| KR | 20230097708 A * | 7/2023 | ............. G06Q 50/10 |

OTHER PUBLICATIONS

Kwon O Jae, Machine Translation of KR-20230097708-A, Jul. 2023, espacenet.com (Year: 2023).*
Rohit Kumar, Machine translation of IN-202211012388-A, Sep. 2023, inPASS (Year: 2023).*

* cited by examiner

*Primary Examiner* — David P. Merlino
(74) *Attorney, Agent, or Firm* — SoraIP, Inc.

(57) ABSTRACT

The control device includes a determiner configured to determine whether or not the kite is in the dive mode based on an attitude of the kite including an aerodynamic characteristic changer capable of changing aerodynamic characteristics, and a controller configured to control the aerodynamic characteristic changer so that the kite turns in a direction opposite to a current turning direction of the kite when the kite is determined to be in the dive mode.

5 Claims, 3 Drawing Sheets

CONTROL DEVICE

CROSS-REFERENCE TO RELATED APPLICATION

This application claims priority to Japanese Patent Application No. 2024-001330 filed on Jan. 9, 2024, incorporated herein by reference in its entirety.

BACKGROUND

1. Technical Field

The disclosure relates to the technical field of control devices for kites.

2. Description of Related Art

As a device of this type, for example, a device for controlling a variable wing kite capable of changing aerodynamic characteristics by changing the area of the kite wing has been proposed (Japanese Unexamined Patent Application Publication No. 2020-147266 (JP 2020-147266 A)).

SUMMARY

There is room for improvement in the technology described in JP 2020-147266 A.

The disclosure has been made in view of the above circumstances, for example, and an object thereof is to provide a control device capable of suppressing a kite from crashing.

A control device according to an aspect of the disclosure includes
  a determiner that determines whether a kite is in a dive mode, based on an attitude of the kite equipped with an aerodynamic characteristic changer that is configured to change aerodynamic characteristics; and
  a controller that controls the aerodynamic characteristic changer such that the kite turns in a direction opposite to a current turning direction of the kite, when determination is made that the kite is in the dive mode.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
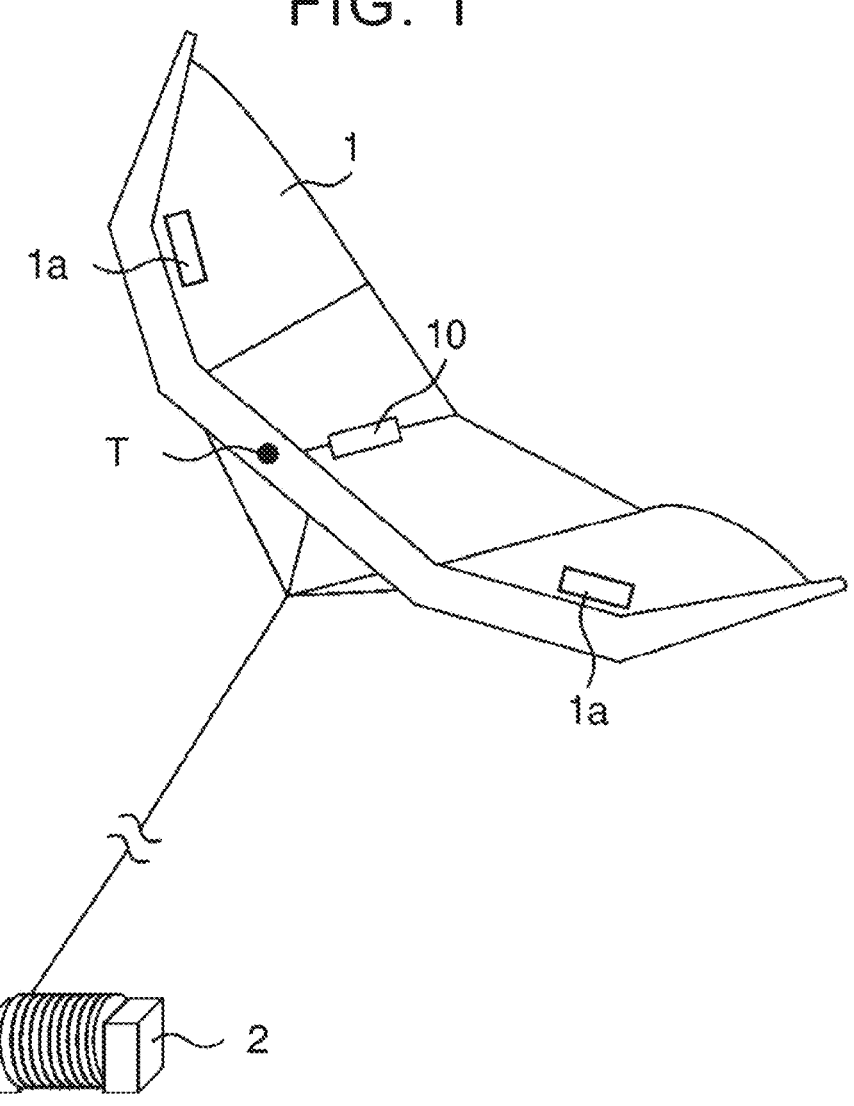
FIG. 1 is a diagram illustrating an example of a kite.

An embodiment of a control device will be described with reference to FIGS. 1 to 5. In FIG. 1, the kite 1 is moored by a tether (kite yarn) to an equipment 2 having a drum around which the tether is wound. The kite 1 has a spoiler (movable plate) 1a capable of changing the aerodynamic characteristics of the kite 1. The kite 1 is formed in a shape having wind-looking stability (in other words, a wind-looking chicken effect can be obtained). The kite 1 may be, for example, an inflatable kite. However, the kite 1 is not limited to inflatable kite. Note that the equipment 2 may be installed on the ground, may be installed on a structure, or may be installed on a device capable of transporting the drum such as a vehicle or a ship.

Figure 2:
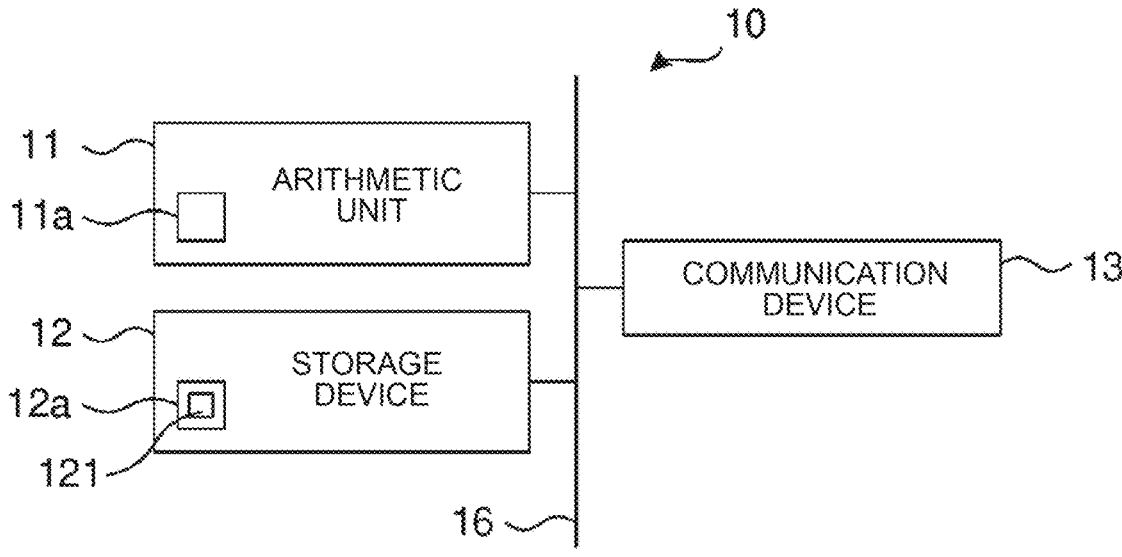
FIG. 2 is a block diagram illustrating an example of a configuration of a control device according to the embodiment.

A control device 10 is attached to the kite 1. Note that the control device 10 may not be attached to the kite 1. For example, the equipment 2 may comprise a control device 10. The control device 10 will be described with reference to FIG. 2. In FIG. 2, the control device 10 includes an arithmetic unit 11, a storage device 12, and a communication device 13. The arithmetic unit 11, the storage device 12, and the communication device 13 may be connected via a data bus 16. The control device 10 may include at least one of an input device and an output device in addition to the arithmetic unit 11, the storage device 12, and the communication device 13.

The arithmetic unit 11 may include a processor 11a. Note that the arithmetic unit 11 may include other processors in addition to the processor 11a. That is, the arithmetic unit 11 may include one or more processors. Note that the processor 11a may be a multi-core processor. When the arithmetic unit 11 includes a single processor 11a that is a multi-core processor, it can be said that the arithmetic unit 11 logically includes a plurality of processors.

The processor 11a may be at least one of, for example, CPU (Central Processing Unit), GPU (Graphics Processing Unit), FPGA (Field Programmable Gate Array), and TPU (Tensor Processing Unit).

The storage device 12 may include a memory 12a. Note that the storage device 12 may include other memories in addition to the memory 12a. That is, the storage device 12 may have one or more memories. The memory 12a may be, for example, at least one of a RAM (Random Access Memory), a ROM (Read Only Memory), a hard disk drive, a magneto-optical disk drive, an SSD (Solid State Drive), and an optical disk array. Therefore, the storage device 12 may have a memory 12a as a non-transitory recording medium.

The communication device 13 may be capable of communicating with a device external to the control device 10. The communication device 13 may perform wired communication or wireless communication.

The storage device 12 can store desired data. A computer program 121 executed by the arithmetic unit 11 may be stored in the memory 12a of the storage device 12. The storage device 12 may temporarily store data temporarily used by the arithmetic unit 11 when the arithmetic unit 11 is executing the computer program 121. Note that the computer program 121 may be acquired from a device (not shown) outside the control device 10 via the communication device 13 (in other words, may be downloaded). The obtained computer program 121 may be stored in a memory 12a.

The processor 11a of the arithmetic unit 11 may execute a process to be performed by the control device 10 together with the memory 12a of the storage device 12 in which the computer program 121 is stored. In other words, the process to be performed by the control device 10 may be executed together with the memory 12a and the computer program 121 stored in the memory 12a. For example, the processor 11a may execute the computer program 121 to implement a logical functional block for executing a process to be performed by the control device 10 in the arithmetic unit 11.

Figure 3:
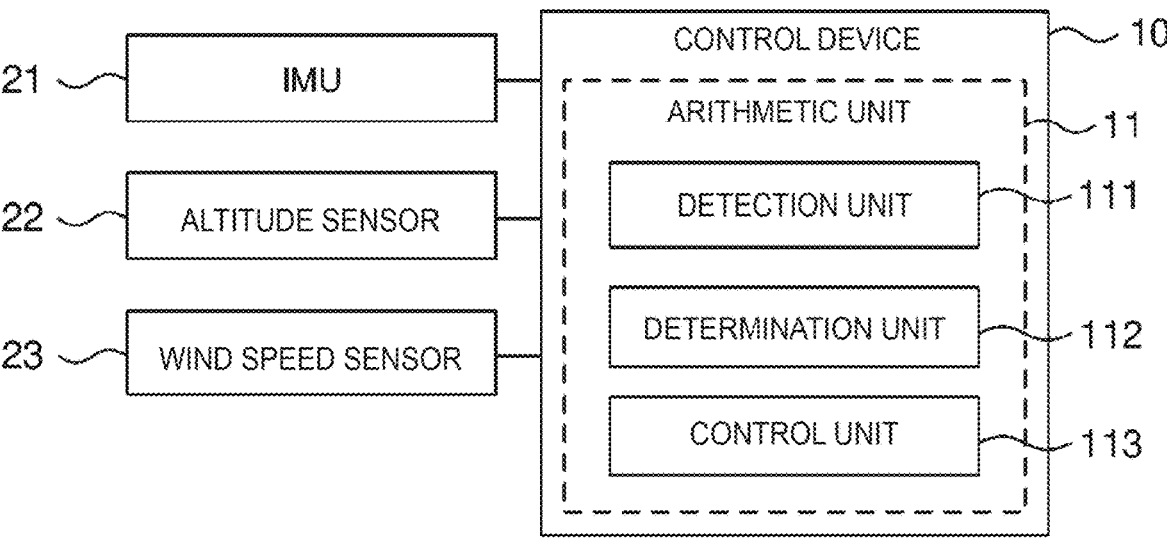
FIG. 3 is a block diagram illustrating an example of a configuration of an arithmetic unit according to the embodiment.

The control device 10 will be described with reference to FIG. 3. In FIG. 3, the arithmetic unit 11 of the control device 10 includes a detection unit 111, a determination unit 112, and a control unit 113 as functional blocks that are logically realized or as processing circuits that are physically realized. Note that at least one of the detection unit 111, the determination unit 112, and the control unit 113 may be realized in such a manner that a logical functional block and a physical processing circuit (that is, hardware) are mixed.

When the detection unit 111, the determination unit 112, and the control unit 113 are implemented as functional blocks, the detection unit 111, the determination unit 112, and the control unit 113 may be implemented by a single processor (for example, a processor 11a). Alternatively, the detection unit 111, the determination unit 112, and the control unit 113 may be implemented by different processors. Alternatively, a part of the detection unit 111, the determination unit 112, and the control unit 113 may be realized by one processor, and the remaining parts of the detection unit 111, the determination unit 112, and the control unit 113 may be realized by one or more processors different from one processor.

IMU (Inertial Measurement Unit) 21, an altitude sensor 22 and a wind speed sensor 23 may be attached to the kite 1. The detection unit 111 of the arithmetic unit 11 detects the attitude of the kite 1 based on the measurement of IMU 21.

The attitude of the kite 1 may be represented by, for example, a XYZ orthogonal coordinate system defined from an X axis, a Y axis, and a Z axis that are orthogonal to each other. Here, the rotation angles around the X-axis, the Y-axis, and the Z-axis are $\theta X$, $\theta Y$, and $\theta Z$, respectively. In this case, the attitude of the kite 1 may be represented by a combination of $\theta X$, $\theta Y$, and $\theta Z$. Note that $\theta X$, $\theta Y$, and $\theta Z$ may be referred to as a roll angle, a pitch angle, and a yaw angle, respectively. The attitude of the kite 1 may be represented by, for example, a quaternion.

As described above, the kite 1 is configured in a shape having wind-looking stability. When the kite 1 is subjected to the crosswind, the attitude of the kite 1 changes due to the wind-looking stability. At this time, the head T (see FIG. 1) side of the kite 1 may be lowered, and a dive state in which the kite 1 is lowered may occur. The "dive state" is hereinafter referred to as "dive mode" as appropriate.

The determination unit 112 of the arithmetic unit 11 determines whether or not the kite 1 is in the dive mode based on the attitude of the kite 1 detected by the detection unit 111. For example, the determination unit 112 may determine whether or not the kite 1 is in the dive mode based on the attitude angle of the kite 1. In this case, when the attitude angle of the kite 1 is equal to or greater than the first predetermined value, the determination unit 112 may determine that the kite 1 is in the dive mode. The determination unit 112 may determine that the kite 1 is not in the dive mode when the attitude angle of the kite 1 is less than the first predetermined value. When the attitude of the kite 1 is represented by a combination of $\theta X$, $\theta Y$, and $\theta Z$, the attitude angle may mean $\theta X$ (that is, a roll angle).

When the determination unit 112 determines that the kite 1 is in the dive mode, the control unit 113 of the arithmetic unit 11 controls the spoiler 1a so that the kite 1 is out of the dive mode. Here, the control unit 113 controls the spoiler 1a so that the kite 1 turns in a direction opposite to the present turning direction of the kite 1. The control unit 113 may specify the current turning direction of the kite 1 based on the exercise history of the kite 1. For example, the control unit 113 may use one of the infinite impulse response filter and the finite impulse response filter to specify the current turning direction of the kite 1. The exercise history of the kite 1 may be generated, for example, based on the outputting of IMU 21.

After the spoiler 1a is controlled by the control unit 113 so that the kite 1 is removed from the dive mode, the detection unit 111 detects the attitude of the kite 1 based on the measurement of IMU 21. The determination unit 112 determines whether or not the kite 1 has left the dive mode based on the attitude of the kite 1 detected by the detection unit 111. For example, the determination unit 112 may determine whether or not the kite 1 has left the dive mode based on the attitude angle of the kite 1. In this case, when the attitude angle of the kite 1 is equal to or less than the second predetermined value, the determination unit 112 may determine that the kite 1 has left the dive mode. The determination unit 112 may determine that the kite 1 does not leave the dive mode when the attitude angle of the kite 1 is larger than the second predetermined value. The second predetermined value is a value smaller than the first predetermined value described above.

When the determination unit 112 determines that the kite 1 does not leave the dive mode, the control unit 113 continues the control of the spoiler 1a for the kite 1 to leave the dive mode. On the other hand, when the determination unit 112 determines that the kite 1 has left the dive mode, the control unit 113 ends the control of the spoiler 1a for the kite 1 to leave the dive mode.

Figure 4:
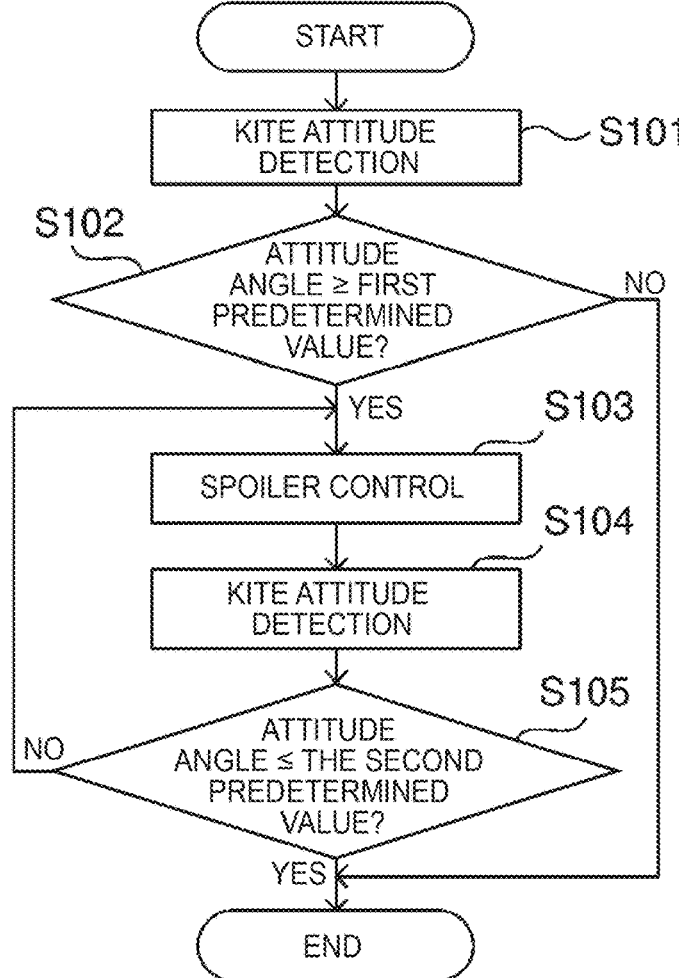
FIG. 4 is a flow chart showing an operation of the control device according to the embodiment.

The operation of the control device 10 will be described with reference to the flowchart of FIG. 4. In FIG. 4, the detection unit 111 of the arithmetic unit 11 detects the attitude of the kite 1 based on IMU 21 measurement (S101). The determination unit 112 of the arithmetic unit 11 determines whether or not the attitude angle of the kite 1 is equal to or greater than a first predetermined value based on the attitude of the kite 1 detected by the detection unit 111 (S102).

In S102 process, when it is determined that the attitude angle of the kite 1 is not equal to or greater than the first predetermined value (S102: No), the operation illustrated in FIG. 4 is ended. This is because the kite 1 is not in the dive mode.

In S102 process, when it is determined that the attitude angle of the kite 1 is equal to or greater than the first predetermined value (S102: Yes), the control unit 113 of the arithmetic unit 11 controls the spoiler 1a so that the kite 1 is removed from the dive mode (S103). In S103 process, the control unit 113 controls the spoiler 1a so that the kite 1 turns in a direction opposite to the present turning direction of the kite 1.

Thereafter, the detection unit 111 detects the attitude of the kite 1 based on IMU 21 measurement (S104). The determination unit 112 determines whether or not the attitude angle of the kite 1 is equal to or less than the second predetermined value based on the attitude of the kite 1 detected by the detection unit 111 (S105).

In S104 process, when it is determined that the attitude angle of the kite 1 is larger than the second predetermined value (S105: No), the above-described S103 process is performed. That is, the control unit 113 continues the control of the spoiler 1a for removing the kite 1 from the dive mode.

In S105 process, when it is determined that the attitude angle of the kite 1 is equal to or less than the second predetermined value (S105: Yes), the control unit 113 ends the control of the spoiler 1a for the kite 1 to leave the dive mode.

Technical Effect

Figure 5:
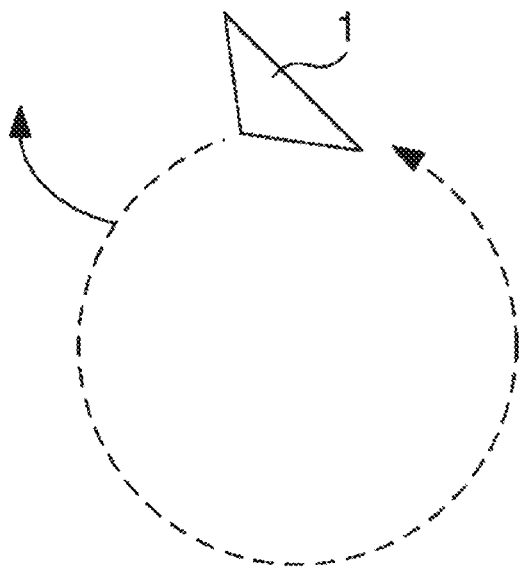
FIG. 5 is a diagram for explaining effects of the control device according to the embodiment.

Technical effects of the control device 10 will be described with reference to FIG. 5. When the kite 1 enters the dive mode, there is also a method of returning the attitude of the kite 1 by turning the kite 1 by 360 degrees in the turning direction when the kite 1 enters the dive mode, as indicated by a dotted arrow in FIG. 5. That is, there is also a method of returning the attitude of the kite 1 by returning the kite 1 from the dive mode.

As described above, the kite 1 enters the dive mode due to the reception of the crosswind. According to research conducted by the inventors of the present application, it has been found that the lower the flight altitude of the kite 1 is, the more easily the kite 1 is subjected to crosswind. That is, when the flight altitude of the kite 1 is relatively low, the kite 1 is likely to be in the dive mode. Therefore, if the kite 1 is turned as indicated by a dotted arrow in FIG. 5, there is a possibility that the kite 1 will fall.

When the determination unit 112 of the arithmetic unit 11 determines that the kite 1 is in the dive mode, the control unit 113 of the arithmetic unit 11 controls the spoiler 1*a* so that the kite 1 turns in a direction opposite to the present turning direction of the kite 1. With such a configuration, the kite 1 can be returned from the dive mode while suppressing a decrease in the flight altitude of the kite 1 as indicated by a solid arrow in FIG. 5. That is, according to the control device 10, it is possible to recover the attitude of the kite 1 while suppressing the fall of the kite 1.

As described above, the first predetermined value used for determining whether or not the kite 1 is in the dive mode and the second predetermined value used for determining whether or not the kite 1 has left the dive mode are different from each other. Specifically, the first predetermined value is larger than the second predetermined value. That is, the control hysteresis is set in the control device 10. With this configuration, for example, it is possible to suppress the kite 1 from being determined to be in the dive mode immediately after it is determined that the kite 1 has left the dive mode.

The "first predetermined value" is a value for determining whether or not the control unit 113 controls the spoiler 1*a* for removing the kite 1 from the dive mode. The first predetermined value may be set as a fixed value in advance, or may be set as a variable value according to some physical quantity or parameter. The "first predetermined value" may be set as follows, for example. The relationship between the attitude angle of the kite 1 and the flight state of the kite 1 may be obtained. Based on the determined relationship, a first predetermined value may be set as a lower limit value of the range of the attitude angle when the kite 1 is in the dive mode.

The "second predetermined value" is a value for determining whether or not the control of the spoiler 1*a* for the kite 1 to leave the dive mode is terminated by the control unit 113. The second predetermined value may be set as a fixed value in advance, or may be set as a variable value according to some physical quantity or parameter. The "second predetermined value" may be set as follows, for example. The relationship between the attitude angle of the kite 1 and the flight state of the kite 1 may be obtained. Based on the determined relationship, the second predetermined value may be set as a value smaller than the lower limit value of the range of the attitude angle when the kite 1 is in the dive mode by a predetermined value.

First Modification

A first modification of the control device 10 will be described. The detection unit 111 of the arithmetic unit 11 may detect the flight altitude of the kite 1 based on the measurement result of the altitude sensor 22 (see FIG. 3). When the determination unit 112 of the arithmetic unit 11 determines that the kite 1 is in the dive mode, the control unit 113 of the arithmetic unit 11 may reduce the tension of the tether anchoring the kite 1 on condition that the flight altitude of the kite 1 detected by the detection unit 111 is equal to or lower than the predetermined altitude. For example, the control unit 113 may control the equipment 2 so as to unwind the tether for mooring the kite 1.

Technical Effect

With this configuration, when the kite 1 is in the dive mode, it is possible to effectively suppress the kite 1 from falling.

The "predetermined altitude" is a value for determining whether or not the control unit 113 reduces the tension of the tether anchoring the kite 1. The predetermined altitude may be set as a fixed value in advance, or may be set as a variable value according to some physical quantity or parameter. The "predetermined altitude" may be set as follows, for example. The relationship between the flight altitude of the kite 1 and the likelihood of the kite 1 falling when the kite 1 is in the dive mode may be determined. Based on the determined relationship, the predetermined altitude may be set as the lower limit value of the range of the flight altitude in which the likelihood of the kite 1 falling is equal to or less than the predetermined value.

Second Modification

A first modification of the control device 10 will be described. The detection unit 111 of the arithmetic unit 11 may detect the wind speed at the position of the kite 1 based on the measurement result of the wind speed sensor 23 (see FIG. 3). When the determination unit 112 of the arithmetic unit 11 determines that the kite 1 is in the dive mode, the control unit 113 of the arithmetic unit 11 may estimate the degree of deformation of the kite 1 caused by the wind based on the wind speed detected by the detection unit 111. The control unit 113 may further control the spoiler 1*a* so that the kite 1 turns in a direction opposite to the present turning direction of the kite 1 based on the estimated degree of deformation of the kite 1.

Technical Effect

With this configuration, it is possible to control the spoiler 1*a* in which the deformation of the kite 1 caused by the wind is considered. As a result, when the kite 1 is in the dive mode, it is possible to effectively suppress the kite 1 from falling.

Aspects of the disclosure derived from the above-described embodiments and modifications are described below.

A control device according to an aspect of the disclosure includes: a determiner configured to determine whether or not the kite is in a dive mode based on an attitude of a kite including an aerodynamic characteristic changer capable of changing aerodynamic characteristics; and a controller configured to control the aerodynamic characteristic changer so that the kite turns in a direction opposite to a current turning direction of the kite when it is determined that the kite is in the dive mode. In the above-described embodiment, the "spoiler 1*a*" corresponds to an example of the "aerodynamic characteristic changer", the "determination unit 112" corresponds to an example of the "determiner", and the "control unit 113" corresponds to an example of the "controller".

In the control device, based on the attitude of the kite after the kite is determined to be in the dive mode, the determiner may determine whether the kite has left the dive mode. In this aspect, when the attitude angle indicating the attitude of the kite is equal to or greater than the first predetermined value, the determiner may determine that the kite is in the dive mode. Further, when the attitude angle becomes equal to or smaller than the second predetermined value smaller than the first predetermined value after it is determined that the kite is in the dive mode, the determiner may determine that the kite has left the dive mode.

In the control device, when it is determined that the kite is in the dive mode, the controller may reduce the tension of the tether anchoring the kite on condition that the flight altitude of the kite is equal to or lower than a predetermined altitude.

In the control device, when it is determined that the kite is in the dive mode, the controller may control the aerodynamic characteristic changer so that the kite turns in a direction opposite to the current turning direction of the kite based on the degree of deformation of the kite caused by the wind.

The present disclosure is not limited to the above-described embodiments, and can be modified as appropriate within the scope and spirit of the disclosure that can be read from the claims and the entire specification, and a control device with such a modification is also included in the technical scope of the present disclosure.

What is claimed is:

1. A control device comprising:
   a determiner that determines whether a kite is in a dive mode, based on an attitude of the kite equipped with an aerodynamic characteristic changer that is configured to change aerodynamic characteristics; and
   a controller that controls the aerodynamic characteristic changer such that the kite turns in a direction opposite to a current turning direction of the kite, when determination is made that the kite is in the dive mode.

2. The control device according to claim 1, wherein the determiner determines whether the kite exited the dive mode, based on the attitude of the kite after determination is made that the kite is in the dive mode.

3. The control device according to claim 2, wherein:
   the determiner determines that the kite is in the dive mode when an attitude angle indicating the attitude of the kite is no smaller than a first predetermined value; and
   the determiner determines that the kite exited the dive mode when the attitude angle is no greater than a second predetermined value that is smaller than the first predetermined value, following determination being made that the kite is in the dive mode.

4. The control device according to claim 1, wherein, when determination is made that the kite is in the dive mode, the controller reduces tension of a tether mooring the kite, on condition that a flight altitude of the kite is no higher than a predetermined altitude.

5. The control device according to claim 1, wherein, when determination is made that the kite is in the dive mode, the controller controls the aerodynamic characteristic changer such that the kite turns in the direction opposite to the current turning direction of the kite, based on a degree of deformation of the kite due to wind.

* * * * *